United States Patent

Wilcher

[11] Patent Number: 5,887,982
[45] Date of Patent: Mar. 30, 1999

US005887982A

[54] BEARING ASSEMBLY FOR USE WITH A SUBMERGED APPARATUS AND METHOD FOR PERFORMING MAINTENANCE THEREON

[75] Inventor: Stephen B. Wilcher, Harleysville, Pa.

[73] Assignee: U.S. Filter Wastewater Group, Inc., Palm Desert, Calif.

[21] Appl. No.: 877,598

[22] Filed: Jun. 17, 1997

[51] Int. Cl.⁶ ............... F16C 3/00; F16C 23/02; F16C 33/66
[52] U.S. Cl. ............ 384/97; 384/247; 384/276; 384/295; 384/315
[58] Field of Search ............ 384/97, 247, 261, 384/263, 276, 278, 295, 297, 299, 315, 428, 434, 435, 906

[56] References Cited

U.S. PATENT DOCUMENTS

| | | | |
|---|---|---|---|
| 2,710,235 | 6/1955 | Olsen | 384/263 |
| 3,084,003 | 4/1963 | Matt et al. | 384/278 |
| 4,653,344 | 3/1987 | Nelson | 384/295 X |
| 4,756,632 | 7/1988 | Belanger | 384/263 X |
| 4,909,639 | 3/1990 | Belanger | 384/906 X |
| 5,246,573 | 9/1993 | Lodholz et al. | 210/159 |
| 5,618,107 | 4/1997 | Bartsch | 384/276 X |

OTHER PUBLICATIONS

Polymer Corporation, *Chemical Resistance Data*, Not Dated, 4 pages Reading, PA.
Polymer Corporation, *Nylatron GSM Blue Nylon Machining Stock*—product brochure, 1995, 6 pages Reading PA.
Link–Belt/FMC, *Series B22400 and B22500–Spherical roller Bearings and Roller Bearing Units*,—product description, Not Dated, 3 pages.
Cooper Bearing Company, *Cooper Split Roller Bearings*—product description, Not Dated, 3 pages.

*Primary Examiner*—Thomas R. Hannon
*Attorney, Agent, or Firm*—Michael, Best & Friedrich

[57] ABSTRACT

The present bearing assembly is for use with a wastewater treatment apparatus which is driven by a drive shaft, e.g., cog rake bar screens, or water treatment apparatus, e.g., paddle wheels in flocculation mixing tanks, and submerged, partially submerged or intermittently submerged in a fluid environment. The bearing assembly includes a tubular member keyed against rotation in a bearing housing with the tubular member bore surfaces engaged against the drive shaft surfaces without rolling elements disposed therebetween thus eliminating the need for lubricators to supply the bearings with grease. Accordingly, the present dry bearing assembly is not subject to failures caused by having the grease in the bearings flushed out by wastewater flows or by submerging of the lubricator. In addition, the keyed connection provided between the housing and bearing member allows the bearing member to be slid out from the housing and rotated so as to present a different section of the load bearing surface below the slowly rotating horizontal shaft for taking the downward loads thereof providing an easy method of performing maintenance on the bearing assembly. Clearances provided between the housing and bearing member facilitate this sliding of the bearing member out from the housing, provide flow paths to allow wastewater to flow out from the bearing assembly, and allow for the bearing member when made from a plastic material to expand radially when exposed to varying temperature wastewater environments. An alternative split construction pillow block bearing assembly is disclosed which allows the bearing member inner surfaces to be observed for any wear and to provide an indication of the level of wear on the primary load bearing surface of the lower half of the bearing member.

18 Claims, 8 Drawing Sheets

BEARING ASSEMBLY FOR USE WITH A SUBMERGED APPARATUS AND METHOD FOR PERFORMING MAINTENANCE THEREON

FIELD OF THE INVENTION

The invention relates to bearing assemblies and, more particularly, to a bearing assembly for use with the drive shaft of a water treatment apparatus which can be operated with the bearing assembly submerged.

BACKGROUND OF THE INVENTION

Municipal wastewater, or domestic sewage, is composed of water borne waste derived from household uses and light industry. This includes human waste and wash waters as well as oils, greases, and animal and vegetable matter. Heavier industrial sources, such as breweries and pulp mills, typically have their own treatment or pretreatment plants because their waste generally would overload the usual municipal facility. Domestic sewage can contain 1000 to 2000 parts per million of solid materials with about half of the material being in solution and half in suspension or floating. The contents of industrial waste vary for different processes of manufacture, and the percentage of solid material in sewage from an industrial plant may be very small or inordinantly large. Where storm rain water is to be led away through sewers, openings in the street gutters afford entrance to the sewers. The same sewer may carry all three types of sewage, i.e., domestic, industrial and storm, in a combined system.

Raw sewage from the sewer mains may contain sticks, leaves, rags, paper, glass, sand, grit, cinders and other objects, all of which are liable to clog or injure pumps. In order to ensure satisfactory operation of the pumps, such materials must be removed before the sewage is admitted to the pumps. Large floating objects are usually removed by means of racks or screens that consist of flat bars of iron or steel set a short distance apart and with the wide faces of the bars parallel. Since the purpose of installing the screen or rack is to remove the larger solids, the bars of the screen are placed ½" to 3" apart. As stated above, these bar screens are used primarily to remove from the sewage sticks, rags, or other materials that may clog pumps or may interfere with the operation of devices for treatment. They are often used in conjunction with a grit chamber placed at either end of the chamber, but generally is at the inlet end. The width and length of the screen are such as may be necessary to provide for the expected maximum flow of sewage with the screen usually set with the bars sloping in the direction of the flow of sewage.

Typically, bar screens must be cleaned on a frequent basis. Bar screens that are not equipped with an automatic cleaning device require an attendant to rake off the screen whenever enough material has accumulated on the screen to interfere with the flow. Hand raking of the screens is an inefficient use of time and manpower. Accordingly, automatic raking mechanisms have been developed for use with bar screens which can be controlled by a timing device for executing cleaning cycles at predetermined periods and/or based on predetermined operating conditions and thus do not depend on the presence or effort of an attendant. An automatic raking mechanism in a cog rake bar screen apparatus is disclosed in U.S. Pat. No. 5,246,573 commonly assigned to the assignee herein. Cog rake bar screens have a rake and drive assembly with rakes connected to a torque tube in which a main transmission shaft is rotatably mounted by bearings. The drive shaft has cog wheels on either end thereof for cooperating with cog pins disposed in substantially vertical side frame members mounted over the screen upstream therefrom. The entire rake and drive assembly moves up and down the side frame members as the drive shaft rotates during a cleaning cycle for raking of the bar screen.

While cog rake bar screens provide substantial advantages in terms of manpower efficiency over the manual cleaning methods previously employed, they can also encounter maintenance problems. One particular problem faced with cog rake bar screens is the failure of the bearings utilized with the main drive shaft. For supporting the drive shaft for rotation, conventional metal contacting roller element bearing units are provided on either end of the shaft. One of the primary benefits and features of the cog rake bar screen enabling significant commercial success in recent years is that there are typically no moving parts located below the water surface, and the main drive and rake support assembly including the drive shaft and torque tube with the conventional bearings were always located above the operating floor so that these parts were readily accessible for maintenance purposes. However, many recent applications require that cog rake bar screens be installed in multiple story installations or remote pumping stations, such as near rivers which tend to flood. When utilized in these types of installations, the cog rake bar screen drive carriage has the potential to be submerged during its cleaning cycle such as when the rakes travel towards the bottom of the screen. As the bearings require grease lubrication and thus the use of springloaded automatic lubricators which can be mounted to the drive assembly, they experience significant problems when submerged in wastewater flows. The harsh wastewater environment includes exposure to wide ranging water temperatures from approximately 25° C. to −5° C. and exposure to a variety of different corrosive chemicals that can be found in and added to wastewater. It has been found that when the bearings are submerged, the flow of water or sewage tends to flush the grease from the bearings, leading to rapid surface wear and corrosion and additional maintenance requirements. In addition, no current commercially available lubricators are made for fully submerged service. All these factors lead to repeated failures when the cog rake bar screen drive carriage is utilized in applications where the drive assembly is likely to be submerged in wastewater exposing the bearings and lubricators therefor to the harsh wastewater environment. When the bearings fail, the entire drive carriage must be removed from the frame of the cog rake bar screen and disassembled in order to replace the drive shaft support bearings.

Other places where conventional metal-to-metal contacting roller element bearings are not acceptable for use because of exposure to water requiring frequent maintenance is in flocculation mixing tanks. Chemicals are added to the sewage as coagulants to improve sedimentation with thorough mixing of the coagulant chemical with the sewage being desirable in order to obtain economy in chemical dosage. Gentle mixing is also generally necessary in order to obtain a floc, or coagulant, that is large enough to settle. After the floc has been formed, provision must be made for a quiescent period, during which the floc can settle and carry down with it the suspended and colloidal matter in the sewage. These conflicting requirements are best met by providing a separate mixing tank which is apart from the sedimentation basins. The agitating and stirring devices are installed in this mixing tank, the effluent from which is discharged into the settling tanks. Mixing tanks can include both a flash mixer in which a turbulent motion is produced for a comparatively short time by a high speed impeller with flocculation taking place in flocculation tanks having slowly turning sets of paddle wheels which give the chemically treated sewage a slow rolling motion causing the wellflocculated flocculated sewage to return periodically to the part of the chamber in which the sewage is not so completely flocculated to keep it in the mix. Typically, several such paddle wheels are axially aligned and are driven by a common drive shaft, and a mixing tank can include several sets of axially aligned paddle wheels. As the shaft bearings are submerged and continually exposed to wastewater and the coagulating chemicals added to the tank, conventional rolling element bearings are subject to failure and require frequent maintenance and repair when used in this setting. Rigid sleeve bearings, bronzed bushed or babbitted, have also been utilized in this service; however, they require constant greasing via grease lines extended to the top of the basin walls along with grease grooves in the bearing assembly inside diameter. Accordingly, there is a need for a bearing assembly for use with a water treatment apparatus which is not subject to the high maintenance and failures conventional bearings experience when submerged and exposed to the harsh wastewater environment. An easy, less burdensome method of performing maintenance on such a bearing assembly would likewise be desirable.

SUMMARY OF THE INVENTION

In accordance with the present invention, a dry bearing assembly is provided for use with an apparatus that can be driven submerged in a fluid and which does not require a separate grease supplying source, such as a lubricator, to provide lubrication between engaged shaft and bearing surfaces, and thus avoids the need for seals and grease fittings and the requisite drilling and tapping of holes therefor. The dry bearing assembly herein provides for low maintenance operation of the wastewater treatment apparatus despite exposure of the bearing assembly to any contaminants in the fluid when submerged therein.

In one form of the invention, the bearing assembly includes a bearing housing and a tubular bearing member supporting the drive shaft for driving of the apparatus without requiring a separate grease supplying source to provide lubrication between engaged shaft and tubular bearing surfaces similar to conventional ball bearings and the like which require separate lubricators to keep the engaged metal surfaces supplied with lubricating grease. As there is no grease supplied to engaged surfaces of the tubular bearing member and shaft, no lubricators are necessary, and the seals and grease fittings necessary in conventional bearings are no longer required. Thus, bearing failures are reduced with the present bearing assembly and the high maintenance required on conventional bearings when submerged and subject to wastewater and the like is avoided.

Preferably, a releasable connection is provided between the housing and bearing member to fix the bearing member against rotation in a predetermined load bearing position relative to the housing and to allow the tubular bearing member to be unconnected and rotated to a different predetermined load bearing position and fixed in the housing in the different position with the releasable connection. Accordingly, the life of the tubular bearing member herein is extended as loading only takes place at the bottom of the tubular bearing member, and maintenance as the bearing member wears does not require complete disassembly of the shaft and/or drive carriage from the wastewater treatment apparatus but merely rotation of the tubular bearing member on the shaft to a different load bearing position.

The bearing housing and bearing member preferably includes clearances therebetween which define flow paths for flow therethrough when the bearing assembly is submerged and to allow the bearing member to be easily slid out from the housing for rotating the tubular member between different predetermined load bearing positions. In this manner, there is no fluid build-up in the bearing assembly herein and maintenance on the bearing is facilitated.

The apparatus can be a wastewater treatment rake and bar screen apparatus with the drive shaft and bearing assembly intermittently being submerged in wastewater, or the water treatment apparatus can be a flocculation mixer apparatus located in a mixing tank including paddle wheels submerged in water with the bearing assembly and drive shaft being continually submerged in water in the mixing tank. Manifestly, the bearing assembly herein can be utilized with other applications in water treatment facilities where the apparatus utilizing the bearing assembly requires the bearing assembly to be exposed to and/or submerged in water.

In another form, the bearing housing has removably attached upper cap and lower base portions, and the tubular bearing member is split with one bearing portion attached to the housing cap and the other bearing portion attached to the housing base to allow the upper cap portion to be detached from the lower base portion for checking of wear. The above split construction provides the bearing assembly herein with an easy way to perform a maintenance check thereon without requiring the entire drive shaft to be pulled from the apparatus for disassembly of the bearings.

A keyed connection can be provided and may include four keys and cooperating keyways to provide four different predetermined load bearing positions for the bearing member. The keys can be on one of the housing and the bearing member with the keyways being on the other of the housing and bearing member. In another form, the keyways can be formed in the housing and the bearing member with the keys being separate key members in aligned keyways of the housing and bearing member to fix the bearing member in one of its load bearing positions.

In another form, the tubular bearing member can be of a plastic material impregnated with a lubricating and strengthening agent for self-lubricity and high load bearing capacity. Clearances can be provided between the housing and bearing member for accommodating thermal expansion of the plastic tubular bearing member when exposed to various wastewater temperatures.

Another aspect of the present invention is a method for performing maintenance on a bearing of a substantially horizontally disposed drive shaft of an apparatus such as a wastewater treatment apparatus. A bearing assembly is provided including a bearing housing supporting a sleeve bearing member with the drive shaft being mounted in the bearing member for rotation. The bearing member is capable of being submerged such as in wastewater during operation of the wastewater apparatus. The method includes opening the bearing housing for accessing the sleeve bearing member, rotating the sleeve bearing member through an angular distance, and fixing the bearing member with a different portion of the inner bearing surface of the bearing member below the drive shaft to take the downwardly directed loads of the horizontally disposed shaft. Preferably, the method includes a key connection between the bearing member and the bearing housing and the sleeve member is slid from the bearing housing and rotated through a predetermined distance to align a different key connection between the bearing member and the bearing housing.

The bearing housing can include an upper cap portion removably secured to a lower base portion and the sleeve bearing member can be split into two portions with one portion attached to the housing cap and the other portion attached to the housing base, and opening the bearing housing includes separating the upper cap portion off from the lower base portion to allow the inner bearing surface on the one portion of the bearing member attached to the housing cap to be observed for wear. As previously mentioned, the above split construction allows the bearing assembly herein to be checked for wear in a much simpler and more time efficient manner than with conventional rolling element bearings.

DETAILED DESCRIPTION OF THE PREFERRED EMBODIMENTS

Figure 1:
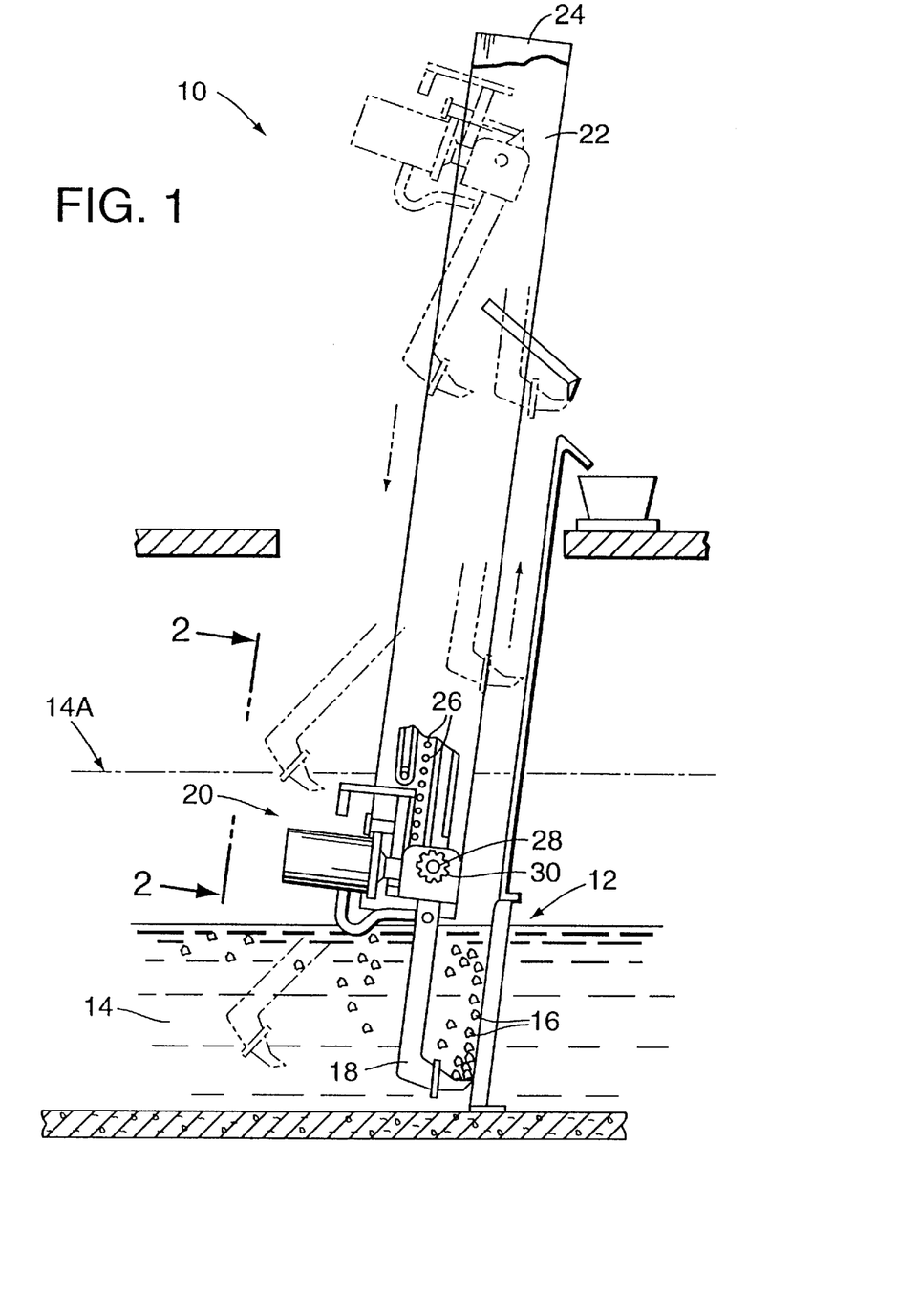
FIG. 1 is a side elevational view of a cog rake bar screen apparatus showing a rake and drive assembly thereof traveling through a cleaning cycle and being intermittently submerged in wastewater during high water levels.
Figure 2:
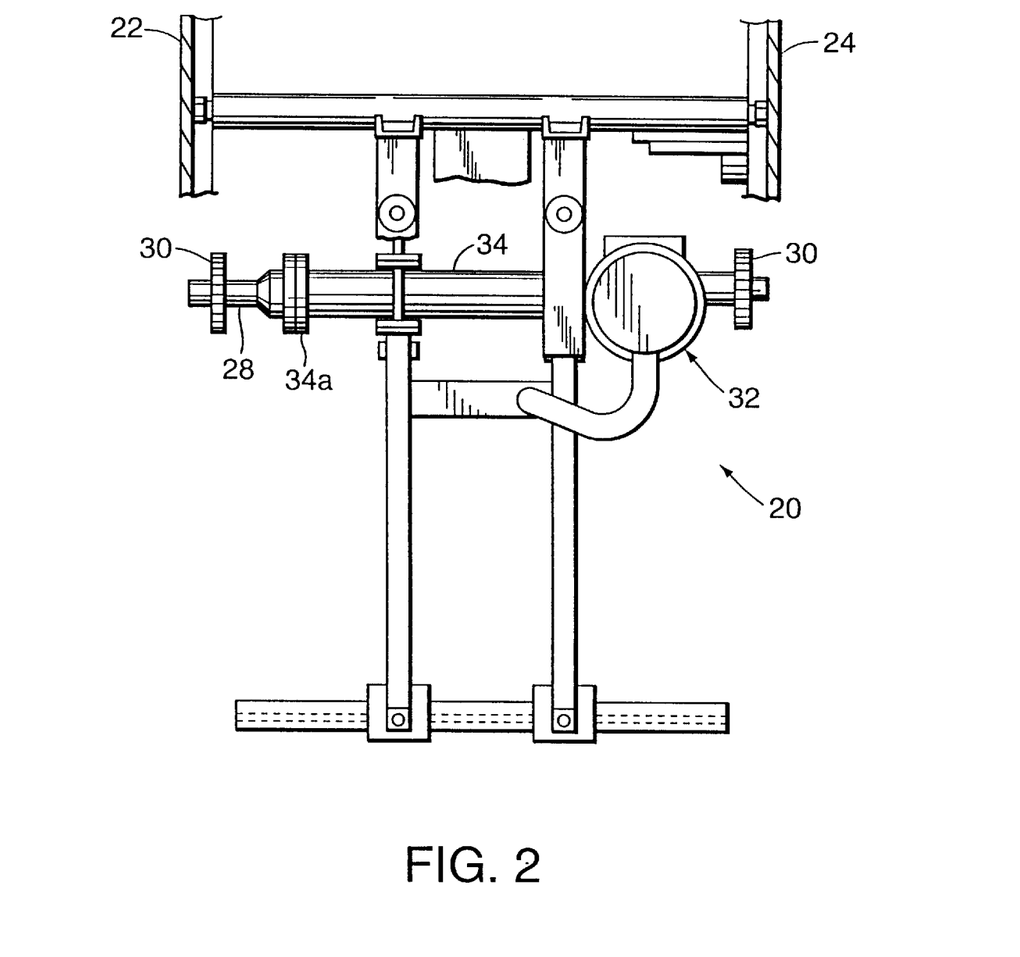
FIG. 2 is a front elevational view taken along lines 2—2 of FIG. 1 showing the rake and drive assembly including a torque tube and drive shaft and the bearing on one end thereof.

FIG. 1 illustrates a wastewater treatment apparatus 10 in the form of a cog rake bar screen with which the present invention can be utilized. The cog rake bar screen apparatus 10, as previously described, includes a bar screen 12 disposed in a flow of wastewater 14 having various foreign particular matter and debris 16 carried therein which accumulates on the upstream side of the bar screen 12 for being removed by rake arms 18 driven along the bar screen 12 from the bottom to the top thereof by rake and drive assembly 20. Side frame members 22 and 24 of the cog rake bar screen 10 include cog pins 26 attached thereto. A main drive shaft 28 of the rack and drive assembly 20 has cog wheels 30 secured on either end thereof in engagement with the cog pins 26 so that rotation of the shaft 28 causes the assembly 20 to undergo cleaning cycles, as indicated by arrows in FIG. 1. A sealed motor housing 32 houses an electric motor (not shown) therein for driving of the shaft 28 and to protect the motor if submerged during high water levels. The drive shaft 28 is rotatably mounted in torque tube 34 by bearings at either end thereof, one of which is shown in FIG. 2.

More particularly, the bearings utilized with the drive shaft 28 and torque tube 34 in accordance with the present invention is a dry bearing assembly 36 in the sense that since there are no rolling elements as with conventional bearings, no separate lubrication source for supplying the rolling bearing elements with grease, such as by spring-loaded lubricators, is required. Accordingly, the present bearing assembly 36 is particularly well suited for use with a wastewater treatment apparatus, such as the cog rake bar screen apparatus 10, which can be intermittently submerged in wastewater, as when the water level rises to high levels as indicated by water level line 14A in FIG. 1, or when used in applications or locations where the apparatus is continually submerged in water. As previously discussed, conventional bearings are prone to failure when exposed to the harsh wastewater treatment environment as the flow of water through the bearings can flush lubrication therefrom and ruin spring-loaded lubricators due to both pressure and corrosion causing the bearings to freeze or bind-up, and the chemicals present or added to wastewater can also damage the exposed metal surfaces of the bearings by corrosive attack. By contrast, the present dry bearing assembly 36 does not require a separate grease supplying source for providing lubrication thereto and therefore does not need as much maintenance as conventional bearings when used submerged in wastewater. In addition, when maintenance is required on the bearing assembly 36, it can be done in a much easier and less burdensome manner over conventional bearings, as will be described in more detail hereinafter.

Referencing FIGS. 3–6 for describing the bearing assembly 36, tubular bearing member or sleeve 38 of the bearing assembly 36 is utilized for load bearing purposes as the sleeve bearing 38 has a throughbore in which the shaft 28 is received with the inner bore surface 38a being engaged with the drive shaft outer surface 28a for supporting the shaft 28 for rotation. The sleeve bearing 38 is mounted in an axial bore of bearing housing 40 by a keyed connection, generally designated 42, between the sleeve bearing member 38 and the bearing housing 40. The keyed connection 42 fixes the bearing member 38 against rotation in the housing 40 in a predetermined load bearing position relative to the housing. The sleeve bearing member 38 can be either of a plastic or metallic material. Plastic is the preferred material. With a plastic bearing 38, four key connections 42 spaced at equal 90° intervals around the bearing member are preferably provided due to the relatively soft, low psi rated plastic material as compared with a metallic bearing. The use of four keys has been found to prevent overloading of the restraining keys and/or keyseats of the bearing assembly. In addition, four keyed connections 42 also provide the bearing assembly 36 with four usable sections of the load bearing surface, as is described in more detail hereinafter.

Because the drive shaft 28 is generally horizontally disposed and rotating fairly slowly at approximately 8 to 12 rpm's in a typical cog rake bar screen 10, the primary load to be taken by the bearing member 38 is in the downward direction. As the section of the bearing surface 38a below the drive shaft 28 wears, the tubular bearing member 38 can be disconnected from the keyed connection 42 as by sliding it out from the housing 40 along the shaft 28 for rotating the bearing member 38 to a different predetermined load bearing position and then sliding it back into the housing to be fixed therein by the keyed connection 42 with a different section of the inner bearing surface 38a positioned below the drive shaft 28 for taking the downward loads thereof. In this manner, the life of the present bearing assembly 36 is extended as a new section of the bearing surface 38a can be presented to the drive shaft 28 when the previous section wears. In the preferred form, four different predetermined load bearing positions are provided so as to allow the bearing member 38 to be rotated up to four times as it wears, which, in essence, extends the life of the present bearing assembly 36 by fourfold.

The bearing member 38 preferably is mounted in the housing 40 with clearances or radial expansion areas 44 provided between the large diameter main body portion 46 of the sleeve bearing 38, and specifically the outer surface 46a thereof, and the inner bore surface 40a of the bearing housing 40. In this manner, wastewater which gains access into the bearing assembly 36 is provided with a flow path for flowing out therefrom so as to limit the accumulation of wastewater and the chemicals therein, and to avoid pressure buildup of fluid in the bearing assembly 36, which could negatively impact on its load bearing capacity. As the bearing assembly 36 does not utilize conventional ball bearings, there is no danger of losing grease from the bearings due to the water flow therethrough, such as if seals fail in conventional bearings.

Figures 3, 4, 5:
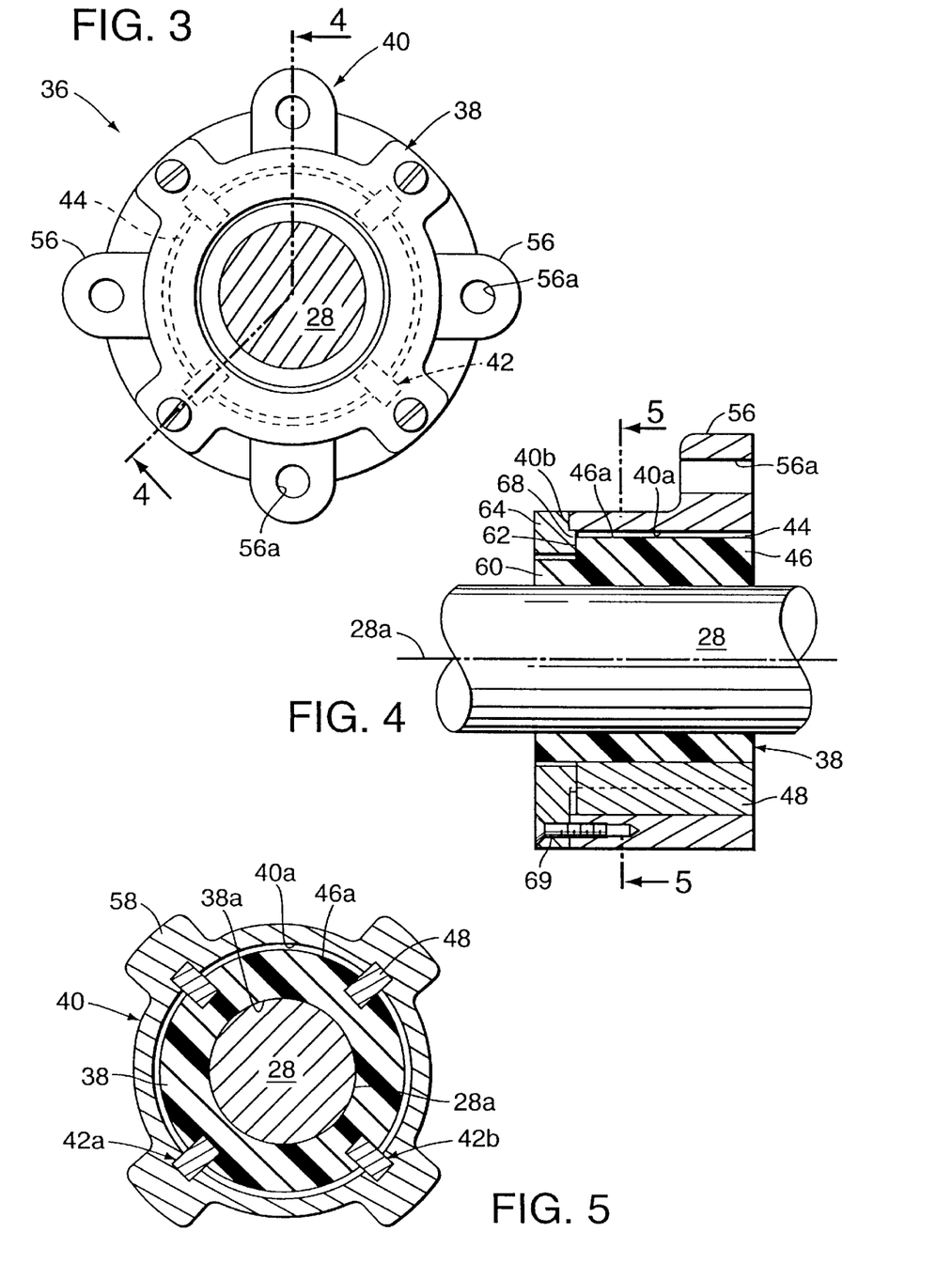
FIG. 3 is a front elevational view of the bearing assembly in accordance with the present invention and showing the keyed connection between the housing and bearing member in ghost.
FIG. 4 is a side sectional view taken along line 4—4 of FIG. 3.
FIG. 5 is a front sectional view taken along 5—5 of FIG. 4.

In the bearing assembly 36 of FIGS. 3–6, the keyed connection 42 is provided by separate key members 48 which have an elongate rectangular bar configuration for mating in similarly configured keyway slots 50 and 52 formed circumferentially equally spaced around the outer bearing member surface 46a and inner housing surface 40a, respectively. The bar key members 48 can be press fit in sleeve bearing keyway slots 50, and preferably are fastened therein. The bearing member 38 can then be slid into the housing 40 with the portions of the bearing keys 48 projecting from bearing slots 50 sliding into housing slots 52. With the bearing member 38 received in the housing 40, the projecting portions of the rectangular bar key members 48 will fit tightly in circumferentially aligned keyway slots 52 to secure the bearing member 38 against rotation in the housing 40 in a predetermined load bearing position therein, as best seen in FIG. 5. It is preferred that the bearing member 38 and housing 40 each have four keyway slots 50 and 52 spaced 90° from each other around their respective surfaces 46a and 40a.

The bearing housing 40 can include an enlarged flange portion 54 adapted to be abutted against torque tube mounting flange 34a and secured thereto by way of mounting bosses 56 having fastener receiving holes 56a extending therethrough. The bosses 56 are equally spaced around the flange portion and are generally disposed along the housing flange portion 54 centrally between the housing keyway slots 52 so that there are four such mounting bosses 56. The bosses 56 are attached by fasteners inserted through the openings 56a and into corresponding openings in the torque tube flange 34a with the four mounting bosses 56 oriented along vertical and horizontal transverse axes that extend through the longitudinal axis 28a of the drive shaft 28. Thus, the slots 52 are angularly spaced 45° from the nearest vertical or horizontal transverse axis. In this manner, when the bearing member 38 is attached in the bearing housing 40, the bottom section of the bearing member surface 38a between the lowermost keyed connections 42a and 42b is the section of the surface 38a which receives the most significant load during rotation of the shaft 28, as best seen in FIG. 5. Accordingly, approximately 90° of the bearing member surface 38a between the keyed connections at 42a and 42b will be the primary surface section utilized for load bearing purposes during rotation of the shaft 28. When the 90° section of the bearing member surface 38a wears, the tubular bearing member 38 can be readily slid out from the housing 40 without requiring any pounding of races off from the shaft as with conventional bearings, and simply rotated through 90° to position another section of the bearing surface 38a between the lower keyed connection points 42a and 42b for presenting a new section of the bearing surface 38a for taking the downward loads from the shaft 28.

Figure 6:
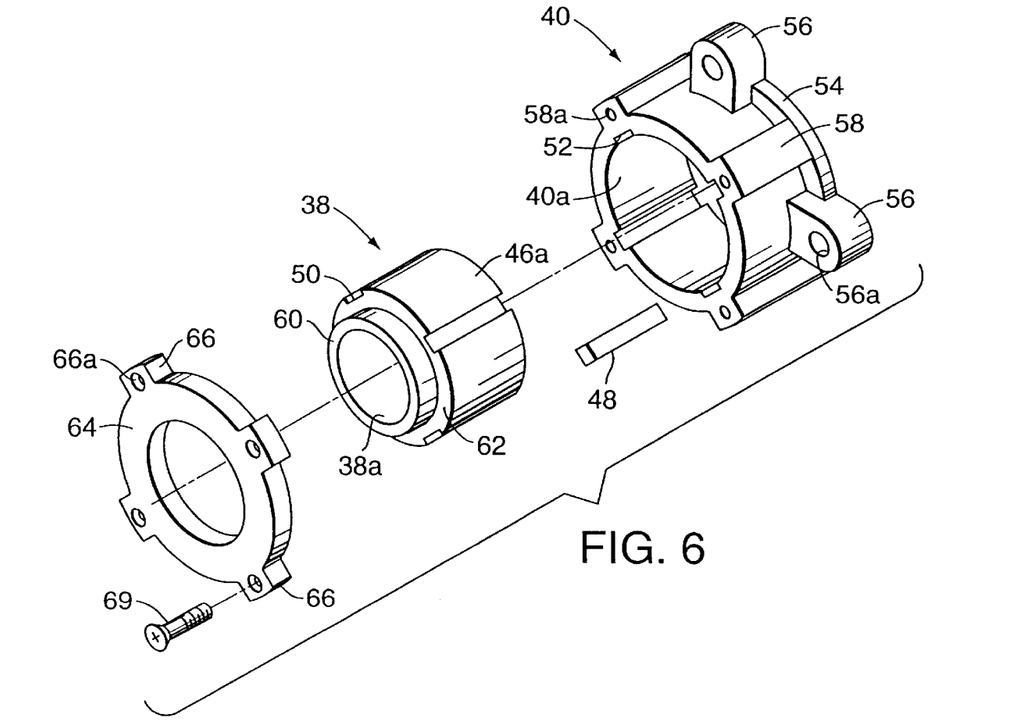
FIG. 6 is an exploded perspective view of the bearing assembly of FIGS. 3–5 showing the keyways formed in the bearing housing and bearing member and the separate key elements.

Turning to details of construction of the bearing assembly 36, the bearing housing 40 can include raised rib portions 58 spaced around the exterior of the housing 40 with the rib portions 58 extending from the housing flange portion 54 axially to the other end of housing 40. The ribs 58 can be aligned with the keyway slots 52 in the bearing housing interior bore surface 40a and include threaded apertures 58a therein. The ribs 58 taken together have a diameter substantially corresponding to the outer diameter of the enlarged flange portion 54, as can be seen in FIG. 6. The body 46 of the tubular bearing member 38 is slightly shorter axially than the bearing housing 40 and includes a circular lip portion 60 of smaller outer diameter than the outer diameter of the bearing body 46 so as to form an annular shoulder surface 62 between the body 46 and lip 60, as best seen in FIGS. 4 and 6.

A ring-shaped face plate 64 includes mounting bosses 66 circumferentially spaced therearound with countersunk apertures 66a therein with the mounting bosses 66 adapted to be aligned with ends of the bearing body ribs 58 at the end 40b of the housing 40 opposite the flange 54. The face plate 64 includes an inner smaller diameter slightly raised section 68 so that with the face plate bosses aligned with the bearing body ribs 58, a fastener 69 such as a flat-head cap screw can be threaded through aligned apertures 66a and 58a to secure the face plate to the bearing housing 40 with the bearing member 38 secured against rotation therein by the keyed connection 42 with the section 68 projecting into the bore of the housing 40. The smaller diameter face plate raised section 68 has an outer diameter corresponding to the diameter of the bearing housing inner bore surface 40a so that fastening of the plate 64 to the housing 40 secures the end 40b of the bearing housing tightly on the exterior circumferential surface of the face plate raised section 68, as best seen in FIG. 4. In addition, the raised section 68 projects inwardly along the bearing housing surface 40a a distance corresponding to the difference in axial lengths between the bearing body surface 46a and housing surface 40a so as to abut against the bearing member shoulder 62 when the face plate 64 is fastened to the housing 40. The inner diameter of the ring-shaped face plate 64 is slightly greater than the outer diameter of the bearing member lip 60 so as to allow access of wastewater therebetween and expansion of the bearing member lip 60. As the abutment of the face plate raised section 68 with the bearing member shoulder 62 does not form a watertight seal therebetween, water can seep therethrough into the clearance area 44 between the bearing member body 46 and the housing 40 for flow of wastewater through and out from the bearing assembly 36.

Thus, to perform maintenance on the bearing assembly 36, i.e., change load bearing positions of the bearing member 38 in the bearing housing 40, the face plate 64 is detached from the housing 40 by unscrewing the cap screws 69. With the face plate 64 detached from the housing 40, the tubular bearing member 38 can be easily slid out of the slots 52 of the housing 40. The sliding of the bearing 38 off from its keyed connection 42 is facilitated by the clearances 44 provided between the bearing member 38 and housing 40 and does not require any special tools and is particularly less burdensome than having to pound races off of the shaft 28 as with conventional bearings, as previously discussed. Once the tubular bearing member 38 has been slid out from the housing 40, the section of the bearing surface 38a that was below the shaft 28 can be inspected for wear, and, if necessary, the bearing member 38 can be rotated through 90° increments to present different sections of the bearing surface 38a below the shaft 28 for taking its downwardly directed loads. With the bearing member 38 so rotated, it can be slid back along the shaft 28 and into the housing 40 into the slots 52 for fixing the bearing member 38 in its different load-bearing position with a new section of the load-bearing surface 38a beneath the shaft 28.

As previously mentioned, the tubular bearing member 38 can be either of a metallic or plastic material. Similarly, the housing 40 can either be of a metallic material, e.g., cast iron, or a plastic material. Where plastic material is used for the bearing member 38, the clearances 44 provide another advantageous feature in that the plastic will tend to expand and contract when exposed to varying temperature wastewater environments. In this event, the clearances 44 provide the tubular plastic member with radial expansion areas to accommodate the thermal expansion of the plastic material in the cylindrical walls of the bearing member 38, as they increase in size radially outward. Radially inward expansion causes the bearing member surfaces 38a to tighten onto the shaft surfaces 28a which can improve the load bearing, particularly as the bearing surfaces wear.

As plastic materials typically have relatively poor PV (Pressure Velocity) ratings, the plastic bearing member 38 is preferably formed with a lubricity and strengthening agent impregnated therein. The plastic bearing member 38 herein preferably is formed from a cast nylon material impregnated with oil and molybdenum having a tradename Nylatron® GSM provided by Polymer Corp. of Reading, Pa. In this manner, the plastic bearing member 38 has self-lubricity and improved load bearing strength over typical plastics. The impregnated nylon material for the tubular bearing member 38 excels in higher pressures, and at low speeds and is ideally suited for the slow rotating, heavy drive and rake assemblies 20 used in cog rake bar screens 10. In addition, the impregnated nylon bearing member has a low coefficient of friction to keep heat build-up during use low, and provides for smoother start-ups and equipment operation. An additional advantage is improved resistance to chemical attack versus the metal surfaces in conventional bearings.

Figure 7:
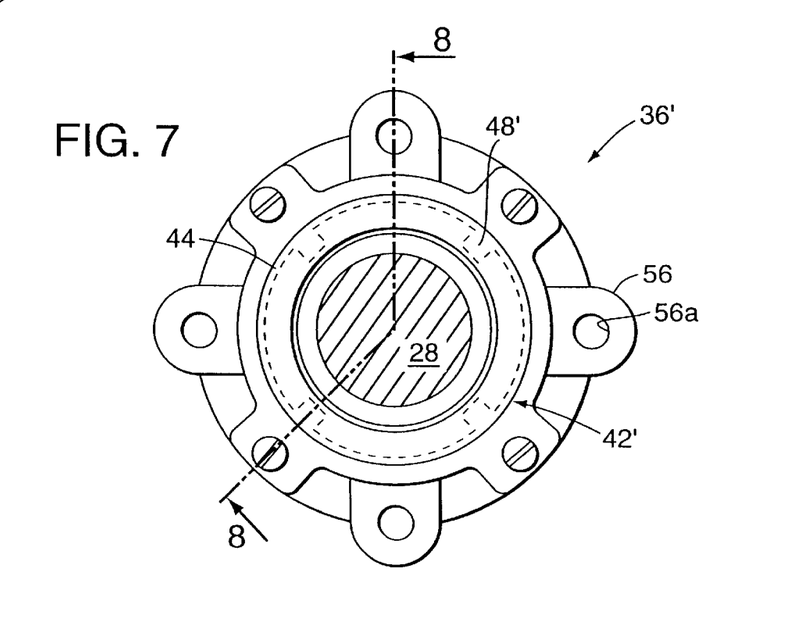
FIG. 7 is a front elevational view similar to FIG. 3 of a preferred bearing assembly in accordance with the present invention and showing the keyed connection between the housing and bearing member in ghost.
Figure 8:
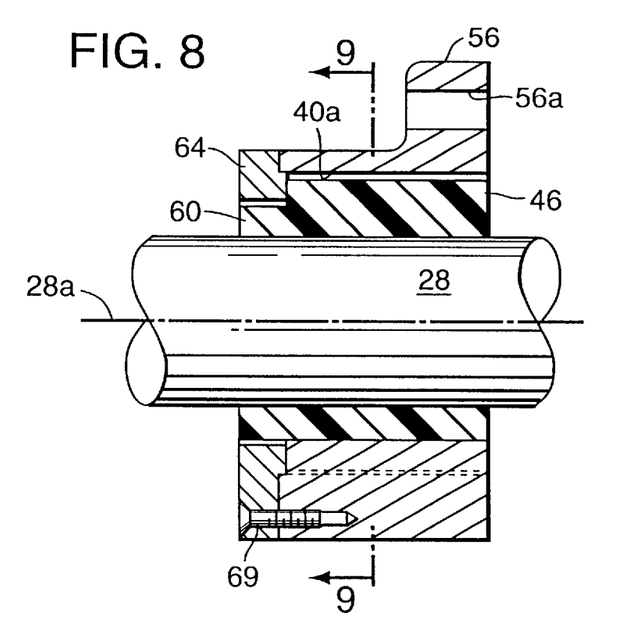
FIG. 8 is a side sectional view taken along the line 8—8 of FIG. 7.
Figure 9:
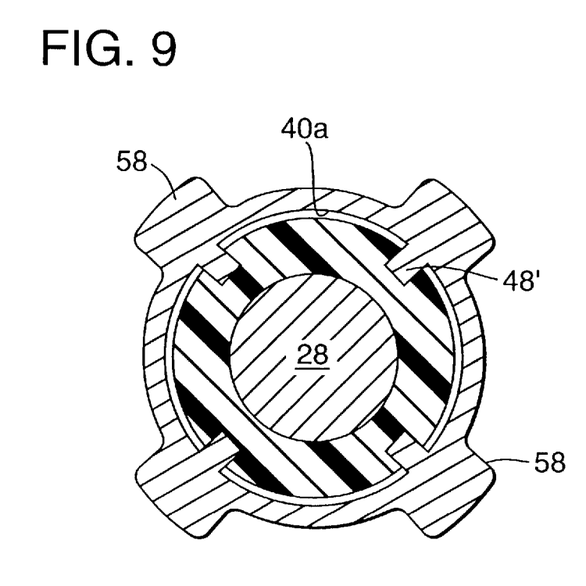
FIG. 9 is a front sectional view taken along the line 9—9 of FIG. 8.
Figure 10:
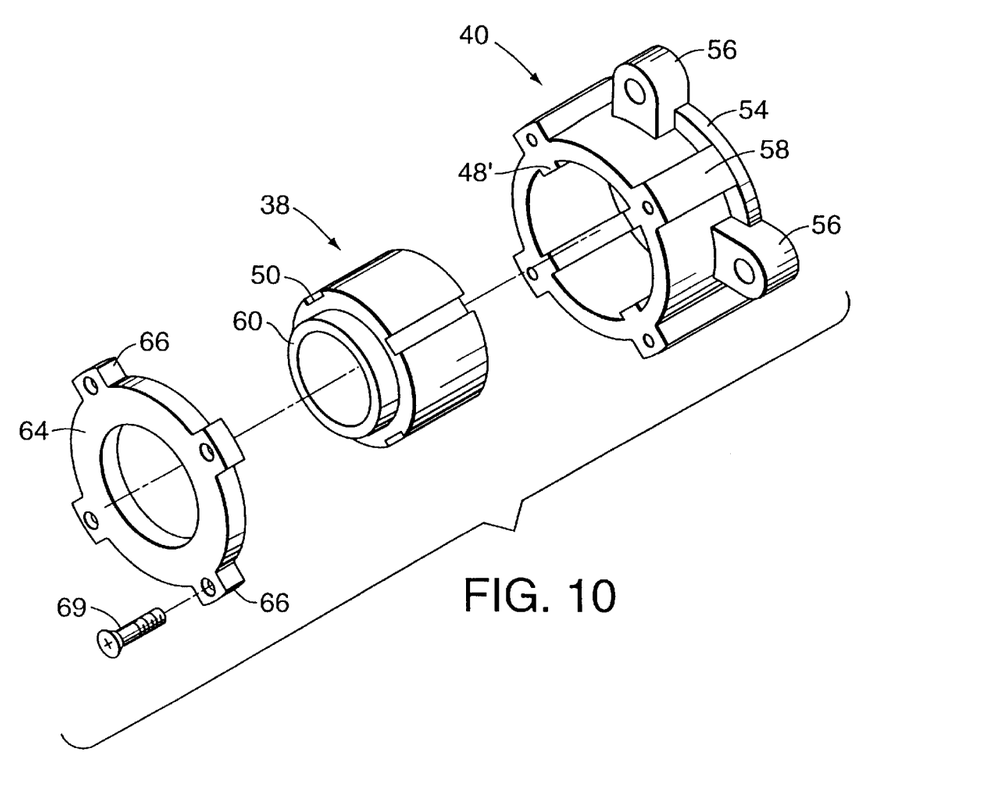
FIG. 10 is an exploded perspective view of the bearing assembly of FIGS. 7–9 showing the keys formed on the bearing housing and the keyways formed on the tubular bearing.

A preferred form of a bearing assembly 36' is shown in FIGS. 7–9 and is substantially the same as the above-described bearing assembly 36 except for the manner in which the keyed connection 42' between the bearing member 38 and housing 40 is constructed. Instead of separate key members 48 and keyway slots 50 in the bearing outer surface 46a in which the key members 48 can be fastened as with bearing assembly 36, the alternative bearing assembly 36' eliminates the slots 52 and has the key members 48' integrally formed with the bearing housing 40 and projecting radially inward from the housing bore surface 40a. As before, the key members 48' fit into keyway slots 50 of the bearing member 38 to secure it against rotation in the bearing housing 40 and to allow the tubular bearing member 38 to be easily slid off from the keys 48' for rotating the bearing 38 to present a new section of its load bearing surface 38a beneath the shaft 28 for taking its primarily downward directed loads.

Figure 11:
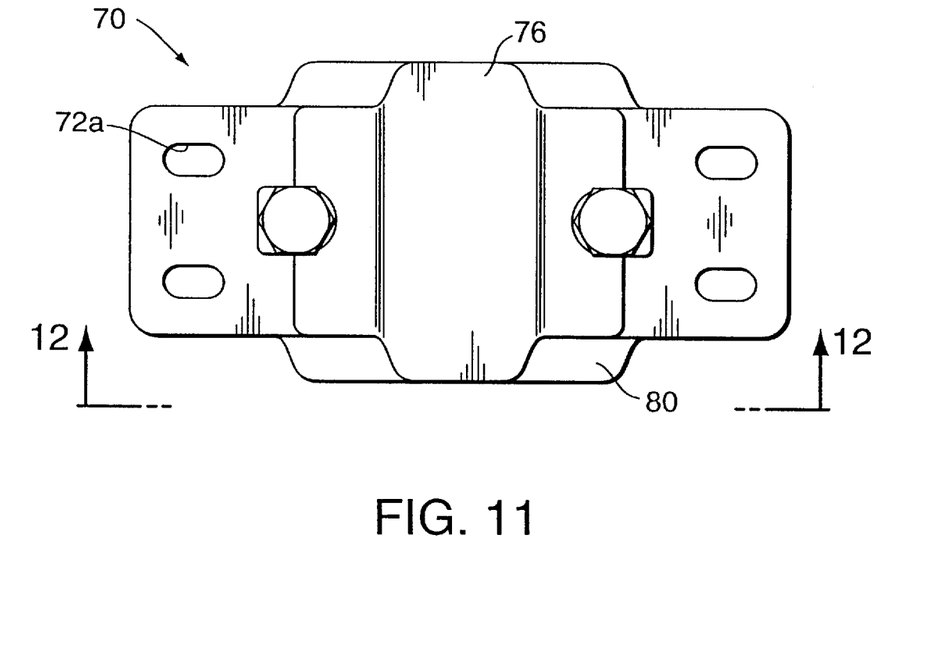
FIG. 11 is a plan view of another alternative bearing assembly according to the present invention.
Figure 12:
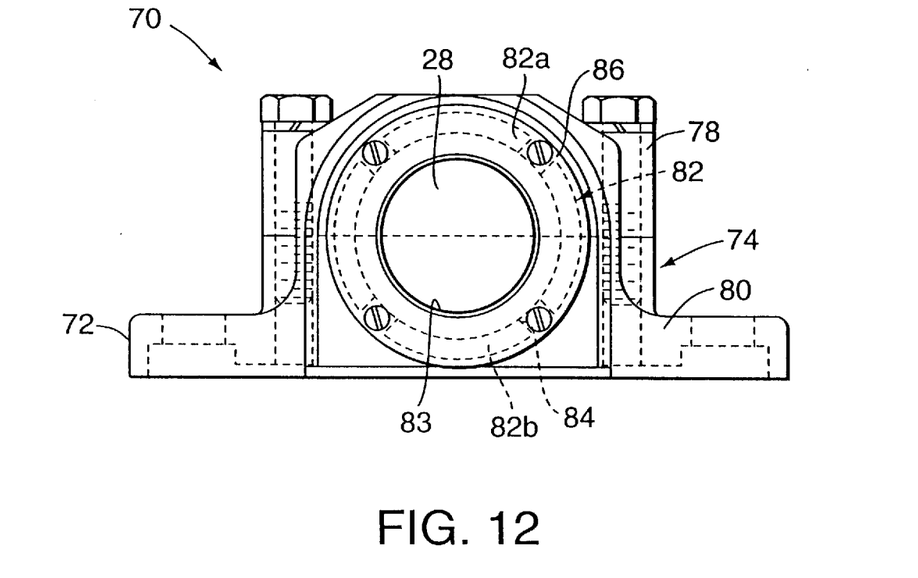
FIG. 12 is a front elevational view taken along the line 12—12 of FIG. 11 showing the split construction of the alternative bearing assembly of FIG. 11.

The bearing assembly 70 of FIGS. 11 and 12 has a split construction to allow for easier visual checks for confirmation of wear on the inner bearing surface 38a. The bearing assembly 70 can have a pillow block form with an enlarged bottom mounting flange 72 35 with fastener receiving holes 72a for mounting of the pillow block bearing assembly 70 to a support. The bearing housing 74 includes an upper cap portion 76 which is bolted as by high strength bolts 78 to lower base portion 80 including mounting flange 72.

The tubular bearing member 82 is similar to previously described bearing member 38 and includes four keyway slots 84 formed around its periphery. However, the bearing member 82 is also split in half into two portions 82a and 82b. Each bearing member portion 82a and 82b includes two slots 84 which can receive keys 86 projecting radially inwardly from the bore surfaces of the housing cap and base portions 76 and 80. Accordingly, the one upper bearing portion 82a can be secured to the housing cap portion 76 by the upper keys 86 thereon and the other lower bearing portion 82b can be secured to the housing base portion 80 by the lower keys 86 thereon. Alternatively, the bearing assemblies 36 and 36' can be provided with the above-described split construction; likewise, the pillow block bearing assembly 70 can also generally take on the previously-described solid, non-split design of bearing assemblies 36 and 36'.

The section of the bearing surface 83 receiving the primary downward loads will be between the lower keys 86 and attached to the housing base portion 80. If this load bearing section is suspected of wear, the face or retaining plate 88 (FIG. 14) can be removed from the front of the split pillow block bearing assembly 70, and the bolts 78 attaching the bearing housing 74 together can be pulled to allow the housing cap 76 along with the attached bearing portion 82a keyed thereto to be removed off from the housing base portion 80. This allows the section of the inner bearing surface 83 on the upper bearing member portion 82a to be readily observed. If there is wear on this section of bearing surface 83, then the section of the bearing surface 83 on the lower bearing member portion 82b which is oriented to take the primary loads of the shaft 28 is likely to have incurred even greater wear. Thus, observing the surface wear on the removed upper bearing member 82a can be utilized as an indicator to determine if the section of the load bearing surface 83 oriented below the shaft 38 should be changed.

Figure 13:
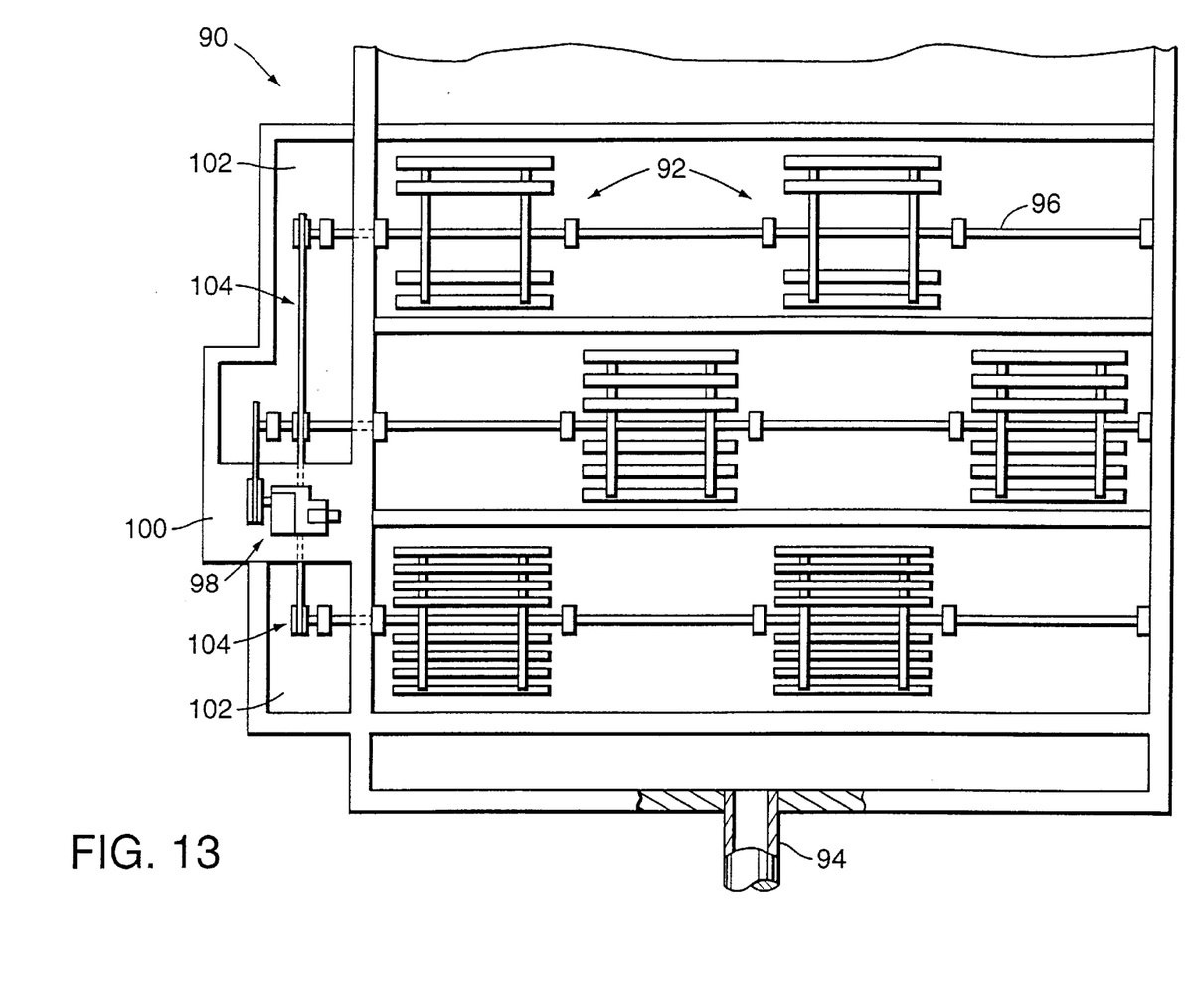
FIG. 13 is a plan view of a mixer tank having paddle wheels driven by drive shafts for mixing of chemicals and fluid in the tank.
Figure 14:
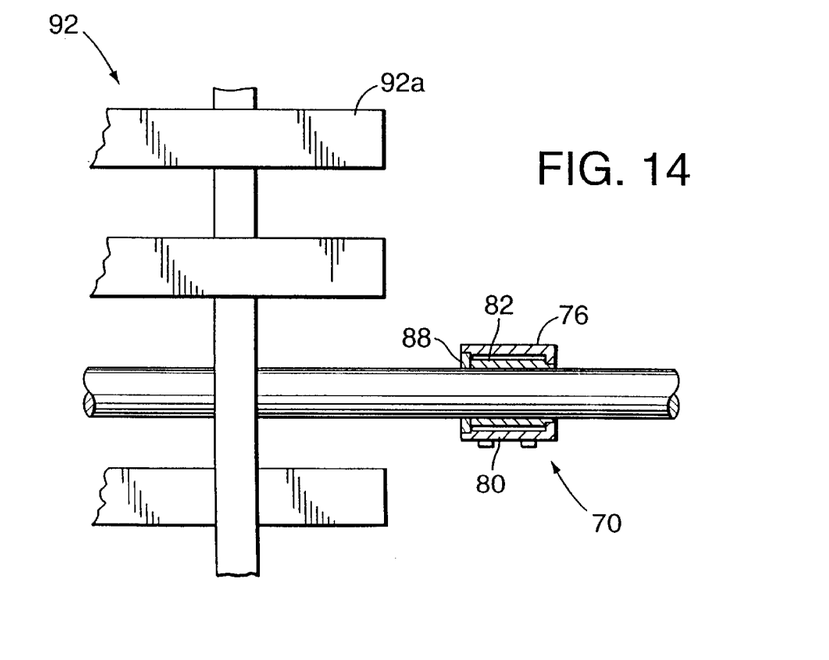
FIG. 14 is an enlarged sectional view of the bearing assembly of FIGS. 11 and 12 utilized with a paddle wheel drive shaft.

Referring to FIGS. 13 and 14, another water treatment application for which the bearing assembly 36, 36', 70 is particularly well suited is illustrated. In this application, the water treatment apparatus is a flocculation mixing tank 90 in which a plurality of paddle wheels 92 are disposed. The mixing tank 90 receives an influent of water or wastewater through inlet pipe 94 and slowly rotates paddles 92a of the wheels 92 through the water via drive shafts 96 to keep the flocs developed by coagulating chemicals added to the water in the mix to ensure maximum flocculation before the water passes into settling tanks. The shafts 96 are driven at a slow rate of approximately 1–3 rpm's for gentle mixing by a motor drive 98 which can be on operating floor 100, as shown. Where several sets of paddle wheels 92 are driven each having their own drive shaft 96, dry wells 102 can be provided alongside the mixing tank 90 for housing shaft transmission systems 104 to drive each of the shafts 96 together at the same speed.

As is apparent, bearings for the shafts 96 are disposed in the tanks 90 continually submerged in the water flow therethrough. To minimize maintenance and bearing failures, the bearing assembly 36, 36', 70 herein can be effectively utilized in the flocculation mixing tank 90 application described above as the constant exposure to the wastewater and chemicals added thereto will not damage the present bearing assemblies 36, 36', 70. Current conventional pillow block bearings typically are mounted on concrete support risers (not shown) extending up from the bottom of the tank so that the present pillow block type bearings 70 herein are well adapted to be utilized in the mixing tanks 90 without requiring any change in design of the tanks 90 while providing improved performance over the previously utilized spherical, sleeve or ball bearings which all require grease. In addition, prior conventional bearings required pulling the entire line of shafting supporting a set of paddle wheels 92 to rebuild or replace their bearings; whereas, the bearing assemblies 36, 36', 70 herein allow maintenance to be performed on individual bearings along a shaft while keeping it in place making bearing maintenance a much less burdensome task.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. In an apparatus that can be driven submerged in a fluid, a dry bearing assembly for a drive shaft of the apparatus, the bearing assembly comprising:

a bearing housing;

a tubular bearing member supporting the drive shaft for driving of the apparatus without requiring a separate grease supplying source to provide lubrication between engaged shaft and tubular bearing surfaces so as to provide for low maintenance operation of the apparatus despite exposure of the bearing assembly to contaminants in the fluid when submerged therein, wherein the bearing housing and the bearing member include clearances therebetween defining flow paths for fluid flow therethrough when the bearing assembly is submerged and to allow the bearing member to slide out from the housing for rotating the tubular bearing member between different predetermined load bearing positions; and a releasable, securing connection between the housing and bearing member to fix the bearing member against rotation in a predetermined load bearing position relative to the housing and to allow the tubular bearing member to be unconnected and rotated to a different predetermined load bearing position and fixed in the housing in the different position with the keyed connection.

2. The bearing assembly of claim 1 wherein the bearing housing has removably attached upper cap and lower base portions and the bearing member is split with one bearing portion attached to the housing cap and the other bearing portion attached to the housing base to allow the upper cap portion to be detached from the lower base portion for checking of wear.

3. The bearing assembly of claim 1 wherein the releasable, securing connection includes four keys and cooperating keyways to provide four different predetermined load bearing positions for the bearing member.

4. The bearing assembly of claim 3 wherein the keys are on one of the housing and the bearing member and the keyways are on the other of the housing and the bearing member.

5. The bearing assembly of claim 3 wherein the keyways are formed in the housing and the bearing member with the keys being separate key members in aligned keyways of the housing and bearing member to fix the bearing member in one of its load bearing positions.

6. The bearing assembly of claim 1 wherein the tubular bearing member is of a plastic material impregnated with a lubricating and strengthening agent for self-lubricity and high load bearing capacity, and clearances are provided between the housing and bearing member for accommodating thermal expansion of the plastic tubular bearing member when exposed to the varying temperature fluid environment.

7. A low maintenance bearing assembly for an apparatus which can be run so that the bearing assembly is intermittently or continually submerged in a fluid, the combination comprising:

a drive shaft which rotates to drive the apparatus;

a sleeve bearing of the bearing assembly including an inner surface thereof which bears against the drive shaft to support the shaft for rotation without rolling elements therebetween, the sleeve bearing being of a plastic material to resist corrosion when exposed to fluids and chemicals therein;

a bearing housing for mounting the sleeve bearing therein; and a radial expansion area between the housing and the sleeve bearing mounted therein to provide clearance for the plastic sleeve bearing for radially increasing in size when exposed to varying temperature fluid environments and for permitting flow of fluid through the bearing assembly to avoid fluid pressure build-up and accumulation of any particulate matter carried in the fluid into the bearing assembly.

8. The combination of claim 7 wherein the drive shaft extends in a substantially horizontal orientation to exert a primary load on the sleeve bearing in a generally downward direction, and a keyed connection between the housing and bearing sleeve providing a plurality of different connecting positions with a different portion of the sleeve bearing inner surface disposed below the drive shaft for taking the primary downwardly directed loads of the horizontal shaft for each connecting position.

9. The combination of claim 7 wherein the sleeve bearing is of a plastic material impregnated with a lubricating and strengthening agent to provide the sleeve bearing with self-lubricity and high load bearing characteristics.

10. A method for performing maintenance on a bearing of a substantially horizontally disposed drive shaft of an apparatus, the method comprising:

providing a bearing assembly including a bearing housing supporting a sleeve bearing member with the drive shaft mounted for rotation with the bearing member and being capable of being submerged;

opening the bearing housing for accessing the sleeve bearing member;

rotating the sleeve bearing member about the drive shaft through an angular distance;

fixing the bearing member back in the housing with a different portion of the inner bearing surface of the bearing member below the drive shaft to take the downwardly directed loads of the horizontally disposed shaft; and providing clearances between the housing and the bearing member when the bearing member has been fixed back in the housing thereby defining flow paths for fluid flow therethrough when the bearing assembly is submerged.

11. The method of claim 10 wherein the bearing housing includes an upper cap portion removably secured to a lower base portion and the sleeve bearing member is split into two portions with one portion attached to the housing cap and the other portion attached to the housing base, and opening of the bearing housing includes separating the upper cap portion off from the lower base portion to allow the inner bearing surface on the one portion of the bearing member attached to the housing cap to be observed for wear.

12. A method in accordance with claim 10 wherein the bearing member has a keyed connection with the bearing housing including the further steps of:

sliding the sleeve member along the drive shaft to separate the bearing member from its keyed connection with the housing; and rotating the bearing member through a predetermined angular distance to align a different keyed connection between the bearing member and the bearing housing.

13. In an apparatus that can be driven submerged in a fluid, a dry bearing assembly for a drive shaft of the apparatus, the bearing assembly comprising:

a bearing housing;

a tubular bearing member supporting the drive shaft for driving of the apparatus without requiring a separate grease supplying source to provide lubrication between engaged shaft and tubular bearing surfaces so as to provide for low maintenance operation of the apparatus despite exposure of the bearing assembly to contaminants in the fluid when submerged therein;

a releasable, securing connection between the housing and bearing member to fix the bearing member against rotation in a predetermined load bearing position relative to the housing and to allow the tubular bearing member to be unconnected and rotated to a different predetermined load bearing position and fixed in the housing in the different position with the connection; and wherein the bearing housing has removably attached upper cap and lower base portions and the bearing member is split with one bearing portion attached to the housing cap and the other bearing portion attached to the housing base to allow the upper cap portion to be detached from the lower base portion for checking of wear.

14. A method for performing maintenance on a bearing of a substantially horizontally disposed drive shaft of an apparatus, the method comprising:

providing a bearing assembly including a bearing housing supporting a sleeve bearing member with the drive shaft mounted for rotation with the bearing member and being capable of being submerged, wherein the bearing housing includes an upper cap portion removably secured to a lower base portion and the sleeve bearing member is split into two portions with one portion attached to the housing cap and the other portion attached to the housing base, and opening of the bearing housing includes separating the upper cap portion off from the lower base portion to allow the inner bearing surface on the one portion of the bearing member attached to the housing cap to be observed for wear;

opening the bearing housing for accessing the sleeve bearing member;

rotating the sleeve bearing member about the drive shaft through an angular distance; and fixing the bearing member back in the housing with a different portion of the inner bearing surface of the bearing member below the drive shaft to take the downwardly directed loads of the horizontally disposed shaft.

15. A waste treatment rake and bar screen comprising:

a rake being driven by a drive shaft during cleaning cycles for movement along a screen disposed in a flow of wastewater to clean the screen; and a dry bearing assembly for the drive shaft, the drive shaft and bearing assembly intermittently being submerged into wastewater during cleaning cycles of the bar screen, the bearing assembly including a bearing housing;

a tubular bearing member supporting the drive shaft for driving of the apparatus without requiring a separate grease supplying source to provide lubrication between engaged shaft and tubular bearing surfaces so as to provide for low maintenance operation of the apparatus despite exposure of the bearing assembly to contaminants in the fluid when submerged therein, wherein the bearing housing and the bearing member include clearances therebetween defining flow paths for fluid flow therethrough when the bearing assembly is submerged and to allow the bearing member to slide out from the housing for rotating the tubular bearing member between different predetermined load bearing positions; and a releasable, securing connection between the housing and bearing member to fix the bearing member against rotation in a predetermined load bearing position relative to the housing and to allow the tubular bearing member to be unconnected and rotated to a different predetermined load bearing position and fixed in the housing in the different position with the keyed connection.

16. A water treatment flocculation mixer comprising:

a mixing tank including paddle wheels submerged in water and driven by a drive shaft for rotating the paddles through the water to mix the water with coagulating chemicals therein; and a dry bearing assembly for the drive shaft, the bearing assembly and drive shaft continuously submerged in water in the mixing tank and exposed to chemicals therein with the dry bearing assembly being substantially impervious to chemical attack, the dry bearing assembly including a bearing housing;

a tubular bearing member supporting the drive shaft for driving of the apparatus without requiring a separate grease supplying source to provide lubrication between engaged shaft and tubular bearing surfaces so as to provide for low maintenance operation of the apparatus despite exposure of the bearing assembly to contaminants in the fluid when submerged therein, wherein the bearing housing and the bearing member include clearances therebetween defining flow paths for fluid flow therethrough when the bearing assembly is submerged and to allow the bearing member to slide out from the housing for rotating the tubular bearing member between different predetermined load bearing positions; and a releasable, securing connection between the housing and bearing member to fix the bearing member against rotation in a predetermined load bearing position relative to the housing and to allow the tubular bearing member to be unconnected and rotated to a different predetermined load bearing position and fixed in the housing in the different position with the keyed connection.

17. A bar screen disposed in a channel of flowing wastewater comprising:

a rake and drive assembly including a drive carriage for traveling with the rake during cleaning cycles with the drive carriage including a drive shaft for driving the rake along the bar screen; and a bearing assembly capable of being intermittently submerged in the wastewater during cleaning cycles, the bearing assembly including a sleeve bearing of the bearing assembly including an inner surface thereof which bears against the drive shaft to support the shaft for rotation without rolling elements therebetween, the sleeve bearing being of a plastic material to resist corrosion when exposed to fluids and chemicals therein;

a bearing housing for mounting the sleeve bearing therein; and a radial expansion area between the housing and the sleeve bearing mounted therein to provide clearance for the plastic sleeve bearing for radially increasing in size when exposed to varying temperature fluid environments and for permitting flow of fluid through the bearing assembly to avoid fluid pressure buildup and accumulation of any particulate matter carried in the fluid into the bearing assembly.

18. A flocculation mixer located in a mixing tank for applying coagulating chemicals to wastewater comprising:

paddle wheels connected to a drive shaft located in the tank for mixing wastewater flowing through the tank with the chemicals; and a bearing assembly for the drive shaft, the bearing assembly being continuously submerged in the wastewater in the mixing tank, the bearing assembly including a drive shaft which rotates to drive the apparatus;

a sleeve bearing of the bearing assembly including an inner surface thereof which bears against the drive shaft to support the shaft for rotation without rolling elements therebetween, the sleeve bearing being of a plastic material to resist corrosion when exposed to fluids and chemicals therein;

a bearing housing for mounting the sleeve bearing therein; and a radial expansion area between the housing and the sleeve bearing mounted therein to provide clearance for the plastic sleeve bearing for radially increasing in size when exposed to varying temperature fluid environments and for permitting flow of fluid through the bearing assembly to avoid fluid pressure buildup and accumulation of any particulate matter carried in the fluid into the bearing assembly.

* * * * *